(12) United States Patent
Yuan

(10) Patent No.: US 6,235,107 B1
(45) Date of Patent: *May 22, 2001

(54) METHOD FOR SEPARATING MIXTURE OF FINELY DIVIDED MINERALS AND PRODUCT THEREOF

(75) Inventor: Jun Yuan, Milledgeville, GA (US)

(73) Assignee: Imerys Pigments, Inc., Roswell, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/405,009

(22) Filed: Sep. 27, 1999

Related U.S. Application Data

(63) Continuation-in-part of application No. 08/876,523, filed on Jun. 16, 1997, now Pat. No. 6,068,693.

(51) Int. Cl.$^7$ .............................. C04B 33/04; C09C 1/42; B03B 1/04
(52) U.S. Cl. ..................... 106/487; 106/488; 501/148; 209/5; 209/10; 209/172
(58) Field of Search .................................... 106/486, 487, 106/488, 416; 501/148, 146; 209/5, 10, 166, 172

(56) References Cited

U.S. PATENT DOCUMENTS

| | | |
|---|---|---|
| 3,857,781 | 12/1974 | Maynard . |
| 4,038,365 * | 7/1977 | Patil et al. ............................ 423/161 |
| 4,088,732 | 5/1978 | Maynard et al. . |
| 4,105,466 | 8/1978 | Kunkle et al. . |
| 4,468,317 | 8/1984 | Turner, Jr. . |
| 4,501,658 * | 2/1985 | Young ...................................... 209/5 |
| 4,604,369 | 8/1986 | Shi . |
| 4,888,315 | 12/1989 | Bowman et al. . |
| 5,147,458 | 9/1992 | Skipper et al. . |
| 5,154,767 | 10/1992 | Kunkle et al. . |
| 5,190,615 | 3/1993 | Kunkle et al. . |
| 5,385,239 | 1/1995 | Kunkle et al. . |
| 5,535,890 | 7/1996 | Behl et al. . |
| 5,573,658 | 11/1996 | Kunkle et al. . |
| 5,584,394 | 12/1996 | Behl et al. . |
| 5,603,411 | 2/1997 | Williams et al. . |
| 5,938,833 * | 8/1999 | Willis et al. .......................... 106/486 |
| 6,068,693 * | 5/2000 | Garforth et al. ...................... 106/487 |

* cited by examiner

Primary Examiner—Michael Marcheschi
(74) Attorney, Agent, or Firm—Finnegan, Henderson, Farabow, Garrett and Dunner, L.L.P.

(57) ABSTRACT

A method for the treatment of a kaolin clay crude to separate by selective flocculation impurity particles contained in the crude from finely divided kaolinite particle contained in the crude, comprising:

(a) forming said crude into a dispersed aqueous slurry b adding water and at least one dispersant to said crude;

(b) conditioning said dispersed aqueous slurry by adding conditioning chemical thereto, the conditioning chemical providing addition of monovalent cations to the slurry without adding multivalent cations thereto;

(c) selectively flocculating said conditioned slurry by adding to said conditioned slurry a composition comprising (i) a high molecular weight component comprising an organic anionic polymer having a molecular weight of at least 1 million; and (ii) a low molecular weight component comprising an inorganic anionic polyphosphate; said composition causing impurity particles in said slurry to flocculate and settle as a dense lower layer and kaolinite particles in said slurry to be deflocculated and concentrated in an upper layer above said lower layer; and (d) separating said lower layer and said upper layer; and wherein the use of said composition in step (c) increases the yield of said kaolinite particles in said upper layer.

18 Claims, 1 Drawing Sheet

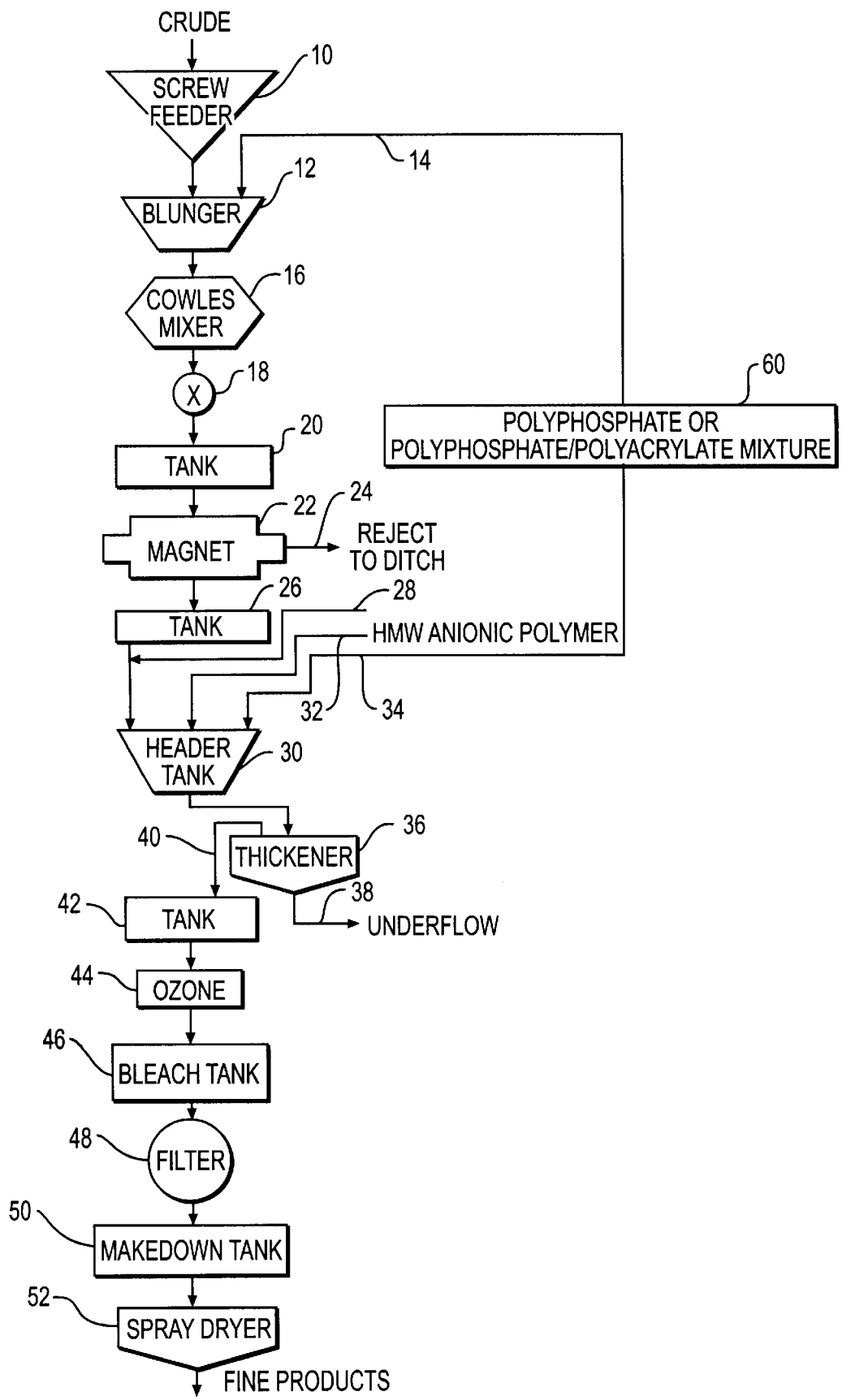

METHOD FOR SEPARATING MIXTURE OF FINELY DIVIDED MINERALS AND PRODUCT THEREOF

RELATED APPLICATIONS

This Application is a continuation-in-part of U.S. patent application Ser. No. 08/876,523 filed Jun. 16$^{th}$, 1997 U.S. Pat. No. 6,068,693.

BACKGROUND OF THE INVENTION

1. Field of the Invention

This invention relates to a method for separating a mixture of finely divided minerals into constituents thereof. In particular, the invention relates to a procedure for effecting such separation by a selective flocculation technique wherein a composition comprising at least two components is employed as selective flocculation additive. Such components are added to a previously processed and conditioned aqueous slurry containing the mixture of minerals to produce a high yield product which is low in impurities. This invention is especially adapted to the separation of colored impurities, such as titania (anatase and rutile) and micas, from kaolin clay.

2. Description of Related Art

When particles of mineral ore or powder mixtures are sufficiently large, for example, larger than 325 (U.S.) mesh, the components of the mixture can be separated by simple physical means such as air or magnetic separation. When particles are finer, more sophisticated technology may be needed to bring about efficient separations. It is conventional to make the separation of finely divided mineral, e.g. particles finer than 325 mesh, by forming the mixture into an aqueous suspension or slurry and providing physical and/or chemical treatments that will bring about a desired separation.

One widely used treatment method is froth flotation. In the case of froth flotation of phosphate or oxidized minerals from siliceous gangue, it is conventional to use a fatty acid collector and a salt promoter. The fatty acid collector coats the mineral particles, which are separated from the siliceous gangue in the form of a froth, and a clay dispersant may be used to keep the clay particles dispersed during the froth flotation process. In the case of kaolin clays which contain significant amount of sub-micron contaminants, conventional froth flotation techniques may not produce the desired removal of colored bodies.

Selective flocculation is a procedure that is widely used commercially to separate finely divided minerals and powders. In the case of clay, some processes utilize anionic polymers to selectively flocculate the clay, leaving the impurities, such as titanium, in the form of titania, dispersed and amenable to subsequent separation from the clay. Commercial variants of selective flocculation employ weakly anionic polymers such as hydrolyzed polyacrylamide to selectively flocculate impurities in the clay, leaving the purified clay dispersed. See, for example, U.S. Pat. No. 3,837,482 to Sheridan; U.S. Pat. Nos. 3,701,417 and 3,862,027, both to Mercade; U.S. Pat. No. 3,371,988 to Maynard, et al.; and U.S. Pat. No. 4,604,369 (Shi).

A variant of the selective flocculation process is where the impurities in the clay are flocculated and the clay remains dispersed in the slurry. Examples of this process are disclosed in U.S. Pat. No. 3,857,781 assigned to Huber; U.S. Pat. No. 4,604,369 assigned to Thiele; and U.S. Pat. Nos. 5,535,890 and 5,603,411 assigned to Engelhard. These processes may employ a water soluble high molecular weight organic anionic polymer having a molecular weight in excess of 1 million, such as a co-polymer of acrylamide, e.g. an acrylamide and acrylate copolymer having a molecular weight in excess of 5 million.

U.S. Pat. No. 4,604,369 further teaches the use of ammonium chloride as an agent for conditioning the slurry to be treated and use of blunging, diluting, and flocculating steps carried out in a substantially continuous manner. U.S. Pat. No. 5,535,890 further teaches the use of a fatty acid and calcium chloride as the conditioning agents.

U.S. Pat. No. 5,603,411 uses a mixture of dispersants including soda ash to disperse a slimed ore pulp prior to conditioning with a fatty acid, salt, and then addition of a polymeric flocculating agent. U.S. Pat. No. 5,584,394 uses a selective flocculation process in which a dispersed aqueous mineral mixture is preconditioned by use of oleic acid and a polyvalent cation which is said to coat the titania, the coated titania is flocculated with high molecular weight anionic copolymer and sodium polyacrylate may be used to disperse kaolin pulp prior to conditioning or after flocculation.

To achieve selective adsorption of a flocculating agent on a particular component of a mixture, a number of methods have been suggested in the literature [Yu and Attia; in "Flocculation in Biotechnology and Separation Systems," (Y. A. Attia, ed.) p. 601, Elsevier, Amsterdam 1987; Behl, S. and Moudgil, B. M., Minerals and Metallurgical Processing, 5, 92,1992 and, Behl, S. and Moudgil, B. M., Journal of Colloidal Interface Science, 160, 1993]. One of the methods involves selectively blocking the active sites on the inert or non-flocculating component for adsorption of the polymeric flocculating agent. This may be achieved by adsorption of a lower molecular weight fraction of the flocculating agent, which can act as a dispersant and/or site blocking agent prior to exposing the particle surfaces to the flocculating agent.

The selective flocculation processes employing high molecular weight anionic polymers to bring about selective flocculation of the impurity particles generally suffer from the problem of low product yields due to the high molecular weight polymers attaching onto and settling with the oppositely charged cationic edges of the kaolin clay particles. Other disadvantages of the processes of this kind used in the prior art involve producing a product with a relatively high level of residual $TiO_2$ such as greater than 0.60% and as high as 1% or more. Additional disadvantages are the formation of small flocs that require a long settling time (with a large volume selective flocculation vessel or 'thickener' to maintain production) and the imparting of minimum shear on the slurry to allow settling. In addition, the presence of fatty acids because of their hydrophobicity may cause performance problems if present in the final product.

The purpose of the present invention is to provide an improved method for the treatment of an aqueous slurry of kaolin clay to separate impurities therefrom by selective flocculation in which the impurity particles are selectively flocculated and the kaolinite particles remain deflocculated, the method being such that the aforementioned disadvantages of the prior art are reduced or eliminated.

SUMMARY OF THE INVENTION

The present invention is directed to a novel selective flocculation method which produces a high yield product which is low in impurities compared to that of the prior art, especially in fine discoloring impurities such as titania. For a crude kaolin clay, a high yield kaolin product lower in titania than current commercially available products produced by comparable prior art processes is produced by the method of the invention. The result is that fine impurities such as titania and mica impurities are removed from the clay by the selective flocculation process giving a beneficial improvement in the brightness and the shade of the clay.

The method of the invention employs in the selective flocculation stage in the treatment of a previously dispersed and conditioned aqueous slurry of kaolin clay the addition of a selective flocculation additive which is a composition comprising at least two components. These components comprise a high molecular weight anionic polymer and a low molecular weight component. In the method of the invention, the low molecular weight component is not used in a conventional manner. Thus, it is not used to break up flocs but is used instead to enhance the flocs which are formed by the high molecular weight polymer, so that the yield is increased, i.e. a greater percentage of kaolinite from the kaolin clay remains in suspension; and the production rate is increased.

It is believed that: a) the low molecular weight component strongly adsorbs onto the kaolinite particles thereby protecting active sites such that the kaolinite remains in suspension instead of being flocculated with the impurities; b) the low molecular weight component acts to optimize the hydrodynamic characteristics to obtain optimized selective flocculation and separation of $TiO_2$ and mica from kaolin slurry; and c) the low molecular weight component displays miscibility with the high molecular weight polymer component to yield surprising results and allow an effective selective separation to be carried out at relatively high solid concentrations, e.g. of between 15 and 35 percent by weight.

According to the present invention there is provided a method for the selective flocculation treatment of a kaolin crude comprising: (a) forming said crude containing finely divided kaolinite particles and impurity particles into a dispersed aqueous slurry by adding water and at least one dispersant to said crude;

(b) conditioning said dispersed aqueous slurry by adding conditioning chemical thereto, the conditioning chemical providing addition of monovalent cations to the slurry without adding multivalent cations thereto;

(c) selectively flocculating said conditioned slurry by adding to said conditioned slurry a composition comprising (i) a high molecular weight component comprising an organic anionic polymer having a molecular weight of at least 1 million, preferably at least 5 million, such as a molecular weight in the range from about 10 to about 20 million; and (ii) a low molecular weight component comprising an inorganic anionic polyphosphate; said composition causing impurity particles in said slurry to flocculate and settle as a dense lower layer and kaolinite particles in said slurry to be deflocculated and concentrated in an upper layer above said lower layer; and (d) separating said lower layer and said upper layer; and wherein the use of said composition in step (c) increases the yield of said kaolinite particles in said upper layer.

The components (i) and (ii) of the said composition are preferably added to the slurry after conditioning in step (b). The components (i) and (ii) may be added together or separately. Preferably, component (i) is added together with or after component (ii).

The selective flocculation process of the present invention involves the separation of constituents in a previously dispersed and conditioned aqueous mineral suspension or slurry.

The slurry may be formed in step (a) by adding water and dispersant to a substantially dry raw kaolin clay, eg in the form of powdery lumps, e.g. in a blunger. The dispersant added may be one or more of the commercially available inorganic or organic compounds known for use in the dispersion of mineral particles, especially particles of kaolin clay, in an aqueous suspension. A liquid working process may be applied to the particles in the dispersed slurry when formed. Such a process may be carried out in a high shear mixing device, e.g. with the slurry having a high solids concentration, e.g. at least 40% by weight, preferably at least 50% by weight. Such a working process serves to break down agglomerates of particle and may also produce finer particles from those present in the treated slurry.

Conditioning is carried out by addition of a conditioning chemical to the treated slurry, eg after formation and optional working. The conditioning chemical may comprise one or more salts of a monovalent cation, e.g one or more halides of sodium, epecially sodium chloride.

In addition to conditioning of the slurry by the use of said conditioning chemical in step(b), conditioning may also optionally be carried out by ageing of the slurry, e.g. by allowing the slurry to remain in a dispersed state without further chemical treatment (during ageing) for a period of time, eg at least 30 minutes, preferably several hours or even days, e.g. up to one week. The slurry may be subjected to light mechanical agitation, eg by stirring or circulation, during optional ageing. If ageing is to occur, it is preferable that it be done before the addition of conditioning chemical.

The objects and resulting benefits of the invention will be better appreciated and understood by those skilled in the art when the following illustrative description is read with reference to the accompanying drawing and the appended claims.

BRIEF DESCRIPTION OF THE DRAWING

The single accompanying drawing represents a flow diagram of a selective flocculation process embodying the present invention.

DETAILED DESCRIPTION OF THE INVENTION

The present invention is directed to a method for the selective flocculation of finely divided particles in a mixture of at least two kinds of mineral particles, one of the kinds of particles being kaolinite. This method is capable of effecting substantial removal of titania (rutile and anatase and mixtures thereof) and micas from crude kaolin clay, especially where the clay is in the form of particles finer than 325 mesh. The result is that substantial amounts of the titania and mica impurities present are separated and removed from the kaolin in order to improve the brightness and the shade of the kaolin product. The present invention may also beneficially improve the high shear rheology of the kaolin slurry as well as the yield of the product and the efficiency of the production process.

The present invention involves unusually a two-component composition for use as the selective flocculation additive in the selective flocculation stage. Both a high molecular weight anionic polymer and a low molecular weight component comprising an inorganic polyphosphate are employed in the composition. It is preferred that the high molecular weight anionic polymer be a copolymer of an acrylamide an at least one organic acid such as acrylic acid. The polymer is of the kind employed to selectively flocculate the impurites rather than the kaolinite and may have between 15% and 40% by weight of its constituent groups which are acid groups. The polymer may have a molecular weight of greater than 1 million, e.g. at least about 5 million, such as from 10 to 20 million. The low molecular weight component may consist of one or more compounds, including one or more polyphosphates, which have a molecular weight of less than 20,000. The polyphosphate may be, for example, sodium hexametaphosphate and/or tetra sodium pyrophosphate or a mixture thereof. The low molecular weight component may comprise in addition to the polyphosphate, one or more organic compounds, e.g a polyelectrolyte such as a polymeric acid or a salt thereof, especially a salt of a monovalent cation. The polymeric acid may comprise polyacrylic acid.

Although it is conventional to add dispersing agents which may comprise a polyphosphate or polyacrylate to kaolin clay to be treated by selective flocculation, such dispersant is normally employed when the clay is first formed into a slurry and not together with high molecular weight polymer at the selective flocculation stage as in the method of the invention. The unexpected performance and yield benefits obtained by adding the low molecular weight component at the later stage are illustrated later.

It is believed that the low molecular weight component when added, particularly when added after conditioning of the kaolin clay slurry, strongly adsorbs onto the kaolinite particles to protect the active sites thereof from attachment by the high molecular weight polymer, thereby inhibiting or resisting the settling and incorporation of the kaolinite particles with the titania and mica enriched underflow, resulting in an increase in yield of the overall final product which is more enriched in kaolinite and less in titania and micas. The low molecular weight component is believed to optimize the results of the selective flocculation process.

The crude clay for treatment according to the method of the present invention may be selected from secondary kaolin clays, e.g. obtained from one of the deposits in Georgia, USA. The clay in dry form may be formed into an aqueous, dispersed slurry in a blunger in a well known manner. As dispersant, sodium hexametaphosphate may be used for example in conjunction with sodium silicate. The sodium hexametaphosphate may be used in an amount of around 5 pounds (active basis) per dry ton of clay and the sodium silicate may be used in an amount of from 4 to 6 pounds (active basis) per dry ton of clay.

The pH of the clay slurry may be adjusted to the required level, e.g. from 6 to 8, especially from 6 to 7, using a base, for example sodium hydroxide or sodium carbonate.

Liquid working of the clay suspension may optionally be carried out in the manner described earlier.

The conditioning chemical added after optional working and preferably after any conditioning by ageing may comprise an inorganic salt, e.g. a sodium salt such as sodium chloride solution which may have a concentration of between 10 and 25 percent by weight and this may be added to the clay slurry in an amount of from 5 to 40 pounds, e.g. 20 pounds per dry ton of clay.

The selective flocculation stage in the method of the invention involves the addition of the said composition of components (i) and (ii) defined earlier. The low molecular weight component (ii) may be added immediately prior to or simultaneously with the addition of the high molecular weight anionic polymer, component (i), or the addition of the high molecular weight anionic polymer may precede the immediate addition of the low molecular weight component. A preferred sequence is to add the low molecular weight component (ii) to the dispersed and conditioned slurry followed by the addition of the high molecular weight anionic polymer, component (i).

If one or more organic compounds are employed together with the polyphosphate in component (ii) the polymer or polymer mixture may have a molecular weight of about 1,000 to 20,000, preferably, about 2000 to 6000, e.g. typically about 3500. This low molecular weight organic compound preferably is a polyelectrolyte and can be selected from the group consisting of polyacrylic acid, copolymers thereof and salts of such polymers, such as sodium polyacrylate, lithium polyacrylate, or ammonium polyacrylate. Sodium polyacrylate is preferred. If the polyphosphate is used in a mixture with polyacrylate, the ratio by weight on an active basis of polyphosphate: polyacrylate in the mixture may be between 99.9:0.1 and 0.1:99.9, preferably the ratio is between 99:1 and 20:80, e.g. between 99:1 and 50:50, e.g. between 95:5 and 70:30. The composition employed in practice will be determined by choosing an effective low molecular weight component for the particular crude clay to be treated.

The low molecular weight component (ii) may be used in an amount of up to 7.0 pounds (active basis) per dry ton of clay, e.g. from 0.01 to 5.0 pounds per dry ton.

The high molecular weight anionic polymer may be used in an amount of up to 2.0 pounds (active basis) per ton of clay, e.g. from 0.01 to 0.5 pounds.

In the selective flocculation processes of the kind to which the invention belongs, in general, when a high molecular weight anionic polymer is added to a dispersed, conditioned kaolin slurry, a flocculated phase forms containing impurities and settles as a dense, viscous, gelatinous bottom layer; the top layer is a dispersed fluid suspension containing the deflocculated product particles. In the instance where a kaolin clay is selectively flocculated in this manner, the bottom layer contains a high percentage of the titania and mica present from particles that have preferentially attached to the high molecular weight polymer and some kaoilinite, and the top layer contains a high percentage of kaolinite and a small amount of titania and mica impurites. In the method of the invention which uses the high molecular weight anionic polymer in the presence of an active low molecular weight component for the selective flocculation of a kaolin clay, the weight percentage of separated impurity in the bottom layer is increased whilst the weight percentage of kaolinite in that layer is decreased, and the weight percentage of kaolinite in the top layer is increased whilst the weight percentage of impurity remaining in that layer is decreased when compared to that of the prior art processes of the same kind. The flocs produced by the method of the invention are more gelatinous resulting in a better separation of the lighter kaolinite enriched overflow from the mica and the titania enriched and heavier underflow.

After the selective flocculation stage, removal of the lower dense gelatinous layer from the remainder of the slurry is readily accomplished by decantation or other conventional unit operations presently used in the art. The overflow or top layer of the slurry containing a concentration of the kaolinite particles can be pumped into a storage tank for further processing required for its end use.

The use of components (i) and (ii) in the selective separation stage of the method of the invention may result in:

1) the percentage yield of the usable, commercial product being increased by about 15% or more, e.g. 25% or more when compared to that of a process of the prior art using only a high molecular weight polymer;

2) some crude kaolin clays previously unused in the processes of the prior art, because they have been unresponsive or less responsive to separation of impurities by selective flocculation in that there are less active sites on these clays, may now advantageously be utilized;

3) both production and capital costs may beneficially be reduced in that the size of the thickener in which the selective flocculation occurs can be reduced and the throughputs of existing thickeners can be increased as the faster forming, larger and more robust flocs allow for greater titania and mica removal under greater turbulence due to the greater throughputs; and 4) a kaolin clay product following selective flocculation treatment having a weight percentage of titania of 0.5% by weight or less, e.g. between 0.1% and 0.5% by weight, a reduced level of mica, and a G.E. or % brightness greater than 89.0, e.g. greater than 89.5 and preferably at least 91.

I. GENERAL PROCEDURE

A general and typical procedure of a preferred embodiment of the present invention is illustrated in the single drawing which shows the processing involving selective flocculation for beneficiation of a crude kaolin clay in a pilot plant of the assignee of the invention, which plant is located in Sandersville, Ga., USA.

A. Dispersion of Crude

The crude clay may be metered by a feed screw 10 to a blunger 12 where it is mixed with water and dispersant and dispersed to a minimum viscosity at a slurry solids of from 50 to 70 percent by weight. The dispersant may typically comprise 5 pounds of sodium hexametaphosphate (active basis) per dry ton of clay and from 4 to 6 pounds of sodium silicate (active basis) per dry ton of clay. The sodium silicate may have a molecular ratio of 3.2 $Na_2O$:1.0 $SiO_2$. The sodium hexametaphosphate may have a molecular ratio of 1.1 NaO:1.0 $P_2O_5$ with a minimum of 65 percent $P_2O_5$, and may be obtained from Calgon Corporation, Pittsburgh, Pa. The sodium hexametaphoshate may be delivered via a feed 14 from a source 60 which may also supply the same compound for use at the selective flocculation stage later. In some cases, sodium polyacrylate may also be delivered together with the sodium fhexametaphosphate to the blunger 12. The pH of the slurry may be about 6.4 to 7.0. A base, e.g. sodium hydroxide (NaOH) or sodium carbonate ($Na_2CO_3$) may be added to the slurry in the blunger 12 to adjust the pH to the required level.

The dispersed clay slurry may then be passed through a Cowles mixer 16 or similar high shear mixer to provide liquid working, and then may be degritted using a SWECO screen 16 a round shaped vibrating screen or similar device to remove particles having a size greater than 100 mesh. Optionally, the degritting step may be conducted prior to the high shear mixing in order to reduce wear or the mixing blade. After fully dispersing and degritting the clay slurry, the slurry may be passed to storage tank 20 where it is diluted to a solids content of 15 to 40 percent solids, preferably, 20 to 35 percent solids, e.g. about 30 percent solids, by weight. The slurry may next be aged for a period of from 15 minutes to several days in a storage tank 18.

B. Magnetic Separation

The diluted slurry may then be metered to a high intensity wet magnetic separator or a super conducting wet magnetic separator, indicated at 22 in the drawing, for removal of separable iron bearing impurities. The product from this process is then diluted to between 15 and 35 percent solids, e.g. to 25 percent solids, by weight and may be stored and/or aged in a tank 24. The impurities are discarded as indicated at numeral 26. This magnetic separation process may be optional and may be employed in a sequence of stages different from that illustrated in the drawing, e.g. after selective flocculation.

C. Chemical Conditioning of the Diluted Slurry

The diluted slurry having a solids content of between 15 and 35 percent solids, e.g. at 25 percent solids, by weight may then be treated with a 10 to 25 percent by weight sodium chloride (NaCl) solution added at a rate of from 5 to 40 pounds (active NaCl) per dry ton of clay with 20 pounds being typical. The sodium chloride may be added to the diluted clay slurry as the slurry exits from tank 26 (indicated by arrow 28) through use of static mixers. The slurry may be stored in a tank 26 for a period of time or it may be passed to a header tank 30 where the two components of the selective flocculation additive are added to the slurry.

D. Addition of the Selective Flocculation Additive

When the slurry, having a solids content of between 15 and 35 percent e.g. 25 percent, by weight, has been passed to header tank 30, it is treated with a selective flocculation additive comprising components (i) and (ii) defined earlier. Preferably, component (ii) is added first followed by component (i). Thus, the low molecular weight component containing polyphosphate is added first. This may comprise sodium hexametaphosphate optionally together with sodium polyacrylate. The low molecular weight component (ii) may be added in a dosage of 0.1 to 5.0 pounds (active basis), in a 3.8 to 20 percent aqueous solution, per dry ton of clay. The mixture of clay slurry/low molecular weight component is then treated with the high molecular weight anionic polymer in a dosage of 0.01 to 0.5 pounds (active basis), in a 0.02 to 0.1 percent aqeous solution, per dry ton of clay.

It should be noted that the addition of the low molecular weight component immediately prior to the addition of the high molecular weight polymer seems to perform the best, but the addition may be done simultaneously with the high molecular weight polymer, or the high molecular weight anionic polymer may be added first followed by the addition of the low molecular weight component. The addition of the high molecular weight anionic polymer to the clay slurry in tank 30 is represented in the drawing by arrow 32. The low molecular weight component may be added to the clay slurry in tank 30 via feed 32 from the source 60.

The high molecular weight anionic polymer, preferably, has a molecular weight in excess of five million, preferably, in the range of 10 to 20 million and preferably, is a copolymer of a acrylamide and one or more organic acids, e,g. acrylic acid. The high molecular weight polymer used in the invention may be any one of those used in the prior art selective flocculation processes wherein impurities are flocculated and kaoliite remains deflocculated, or any one of those commercially available for this purpose. A suitable high molecular weight polymer which has been employed in the method of the invention is the polymeric material supplied under the trade name Nalco 7766 by the Nalco Corporation.

E. Mixing During Addition of Polymers/Water

Since less agitation results in poor selectivity and high shear results in the shearing of flocs, the degree of agitation applied to the clay slurry must be sufficient to incorporate the low molecular weight component, the water, and the high molecular weight polymer component into the clay slurry. Agitation may be carried out in header 30 by mechanical means, or optionally, in-line by use of static mixers.

F. Sedimentation of Titania Enriched Flocs

The sedimentation of the flocs formed by addition of the selective flocculation additive and which are enriched with titania and mica is rapidly accomplished in a high rate thickener 36 where the solids content of the clay slurry is adjusted to between 10 and 35 percent solids by weight. (The thickener 36 is a selective flocculation vessel of a kind well known to those skilled in the art.) As the slurry treated with the two components of the selective flocculation additive is delivered into thickener 36, the flocs begin to settle out of the suspension at a rate of 2 to 10 inches per minute, e.g. at least 3.0 inches per minute. The flocs, enriched with the titania and the mica, and containing the high molecular weight polymer, are gravity settled and drawn off the bottom of thickener 36, as an underflow indicated by arrow 38, at a solids content of between 35 to 65 percent by weight. The kaolinite-rich refined clay slurry is collected from an overflow weir, as indicated by arrow 40, and is pumped into a storage tank 42 for further processing required for end use performance. This further processing may include ozonizing indicated at 44, bleaching indicated at 46, and dewatering, eg by filtering, indicated at 48, followed by either redispersing in a make down tank for shipment as a slurry as indicated at 50 or alternatively spray drying for shipment as a dry product as indicated at 52. These further treatment processes are well known to those skilled in the art and are standard processes for the beneficiation of a kaolin clay.

II. EXAMPLES

The following Examples illustrate the benefits of the method embodying the invention as compared with the prior art. Example 1 is a comparative example representing the prior art. Examples 2 and 3 embodying the invention are carried out in the manner described earlier with reference to the drawing.

In the following Examples, a Middle Georgia crude kaolin clay possessing a GE brightness of 81.6 and impurities comprising 2.3 percent by weight of titanium dioxide and 1.7 percent by weight of iron oxide was treated. The high molecular weight anionic polymer used in the following Examples is a commercially available polymer having a molecular weight range from 10–15 million and available from the Nalco Corporation under the trade name NALCO 7766an anionic polymeric flocculant, comprised of acrylamide/acrylate copolymer, having a charge density of about 25% and a molecular weight around 10–15 million, in a hydrocarbon solvent and water.

EXAMPLE 1

As a comparative example a sample of the Middle Georgia crude clay described hereinabove was formed into a slurry, which was dispersed, liquid worked and conditioned with chemical as described hereinabove with reference to the drawing. The conditioning was carried out by treating the slurry with NaCl added in an amount of 20 lb (active) NaCl per dry ton of clay, the NaCl being in a 0.05 per cent by weight aqueous solution. A dose of 0.25 lb. (active basis) of the high molecular weight anionic polymer (NALCO 7766) was added per dry ton of clay, the polymer being added in a 0.025% by weight aqueous solution. The resulting slurry was diluted to 20% solids and subjected to the selective flocculation process without the addition of the polyphosphate. After allowing for separation, the usable product obtained from thickener 36 had a residual $TiO_2$ level of 0.5% and a product yield of 23%. The kaolinite product from the thickener had a GE brightness of 89.9.

EXAMPLE 2

A sample of the Middle Georgia crude clay described hereinabove was formed into a slurry, which was dispersed and liquid worked as described earlier. The slurry was conditioned with NaCl as described earlier. Subsequently, the conditioned slurry was treated by adding thereto 2 lb. (active basis) per dry ton of sodium hexametaphosphate as the low molecular weight component (ii). Subsequently, 0.25 lb (active basis) per dry ton of the high molecular weight anionic polymer (NALCO 7766) in 0.025% solution was added to the slurry. The resulting slurry was diluted to 20% solid and delivered to a thickener to allow the selective flocculation process to take place. After allowing for separation of the kaolinite product and impurity particles by the selective flocculation process, the usable product obtained from the thickener had a $TiO_2$ level of 0.2% by weight, which is reduced from the value of 0.5% in Example 1, and a product yield of 38%, which is increased for the value of 23% in Example 1. The kaolinite product from the thickener had a GE brightness of 92.0, the improvement being mainly due to the greater removal of titania in this Example compared with Example 1.

EXAMPLE 3

A sample of the Middle Georgia crude clay described hereinabove was formed into a slurry, which was dispersed, liquid worked and salt conditioned as described hereinabove. To the conditioned slurry was added 4 lb. (active basis) per dry ton of sodium hexametaphosphate as the low molecular weight component (ii). Next, 0.25 lb. (active basis) per dry ton of the high molecular weight anionic polymer (NALCO 7766) in 0.025% solution was added to the slurry. The resulting slurry was diluted to 20% solids and subjected to the selective flocculation process in the thickener. After allowing for separation of the kaolinite product from the impurities, the product obtained from the thickener had a $TiO_2$ level of 0.3% by weight and a product yield of 58%. The kaolinite product from the thickener had a GE brightness of 91.1%. These results again demonstrate the improvement in yield and brightness, the latter being mainly due to greater titania removal, by use of the invention in this Example compared with the prior art Example 1.

While the $TiO_2$ measurements are within experimental error for all three experiments, the addition of both sodium hexametaphosphate and the high molecular anionic polymer as selective flocculation additive increased the yield of the usable product from 23% (Example 1) to 38% (Example 2) and to as high as 58% (Example 3).

While the present invention has been particularly set forth in terms of specific embodiments thereof, it will be understood in view of the instant disclosure that numerous variations upon the invention are now enabled to those skilled in the art, which variations yet reside within the scope of the present invention. Accordingly, the invention is to be broadly construed and limited only by the scope and spirit of the claims now appended hereto.

What is claimed is:

1. A method for treating a kaolin clay crude to separate by selective flocculation impurity particles contained in the crude from finely divided kaolinite particles contained in the crude, comprising;
   (a) forming said crude into a dispersed aqueous slurry by adding water and at least one dispersant to said crude;
   (b) conditioning said dispersed aqueous slurry by adding conditioning chemical thereto, the conditioning chemical providing addition of monovalent cations to the slurry without adding multivalent cations thereto;

(c) selectively flocculating said conditioned slurry by adding to said conditioned slurry a composition comprising (i) a high molecular weight component comprising an organic anionic polymer having a molecular weight of at least 1 million; and (ii) a low molecular weight component; said composition causing impurity particles in said slurry to flocculate and settle as a dense lower layer and kaolinite particles in said slurry to be deflocculated and concentrated in an upper layer above said lower layer; and (d) separating said lower layer and said upper layer; and wherein the use of said composition in (c) increases the yield of said kaolinite particles in said upper layer.

2. The method of claim 1 wherein at least two dispersants are added in step (a), said two dispersants comprising sodium silicate and sodium hexametaphosphate.

3. The method of claim 1, wherein the aqueous slurry in step (a) has a pH which is adjusted by addition of a base providing monovalent cations.

4. The method of claim 1 wherein said conditioning chemical in step (b) comprises sodium salt.

5. The method of claim 4 and wherein the sodium salt comprises sodium chloride.

6. The method of claim 1 wherein the amount of said conditioning chemical added is in the range from about 5 to about 40 pounds per ton of crude.

7. The method of claim 1 wherein impurity particles comprise colored titania.

8. The method of claim 1, wherein the method is a continuous process.

9. The method of claim 1 wherein the conditioned slurry has a solids concentration of between 15% and 35% during the selective flocculation step (c).

10. The method of claim 1 wherein said low molecular weight component is added in step (c) immediately prior to or simultaneously with the high molecular weight anionic polymer.

11. The method of claim 1 wherein said high molecular weight anionic polymer is a copolymer of acrylamide with one or more organic acids.

12. The method of claim 1 wherein said low molecular weight component is selected from the group consisting of sodium hexametaphosphate, tetrasodium pyrophosphate and mixtures thereof.

13. The method of claim 1 wherein said low molecular weight component also comprises an organic polyelectrolyte.

14. The method of claim 13 wherein said polyelectrolyte comprises sodium polyacrylate.

15. The method of claim 1 wherein said low molecular weight component comprises a mixture of (i) a polyphosphate selected from sodium hexametaphosphate, tetrasodium pyrophosphate and mixtures thereof and (ii) sodium polyacrylate.

16. The method of claim 1 wherein following step (a) the slurry is liquid worked in a high shear mixing device at a solids concentration of at least 40% by weight.

17. The method of claim 16 wherein following said liquid working the slurry is diluted and conditioned by ageing for a period of at least 30 minutes prior to step (b).

18. The method of claim 1 wherein said yield of said kaolinite particles in said slurry following step (d) is in the ranges from 35% to 70%.

* * * * *